(12) United States Patent
Bharadwaj et al.

(10) Patent No.: US 8,667,332 B2
(45) Date of Patent: Mar. 4, 2014

(54) METHODS FOR OPTIMIZING DIAGNOSTICS REASONER MODELS

(75) Inventors: Raj M. Bharadwaj, Maple Grove, MN (US); Darryl G. Busch, Eden Prairie, MN (US); Daniel P. Johnson, Fridley, MN (US); Ranjana Ghosh, Minneapolis, MN (US)

(73) Assignee: Honeywell International Inc., Morristown, NJ (US)

( * ) Notice: Subject to any disclaimer, the term of this patent is extended or adjusted under 35 U.S.C. 154(b) by 1609 days.

(21) Appl. No.: 11/739,372

(22) Filed: Apr. 24, 2007

(65) Prior Publication Data

US 2008/0266141 A1    Oct. 30, 2008

(51) Int. Cl.
*G06F 11/00*    (2006.01)

(52) U.S. Cl.
USPC .................. 714/26; 714/25; 714/46; 714/52

(58) Field of Classification Search
USPC ...................... 714/2, 25, 46, 52, 26
See application file for complete search history.

(56) References Cited

U.S. PATENT DOCUMENTS

| | | | |
|---|---|---|---|
| 5,107,499 A | 4/1992 | Lirov et al. | |
| 5,253,332 A | 10/1993 | Kumamoto | |
| 5,351,247 A | 9/1994 | Dow et al. | |
| 5,412,802 A | 5/1995 | Fujinami et al. | |
| 5,475,695 A | 12/1995 | Caywood et al. | |
| 5,493,729 A | 2/1996 | Nigawara et al. | |
| 5,544,308 A | 8/1996 | Giordano et al. | |
| 5,561,760 A | 10/1996 | Ferris et al. | |
| 5,633,800 A | 5/1997 | Bankert et al. | |
| 6,076,083 A | 6/2000 | Baker | |
| 6,442,542 B1 | 8/2002 | Ramani et al. | |
| 6,529,893 B1 | 3/2003 | Foner et al. | |
| 2004/0176887 A1* | 9/2004 | Kent et al. | 701/30 |
| 2006/0085108 A1 | 4/2006 | Grier et al. | |
| 2007/0101178 A1* | 5/2007 | Jammu et al. | 714/4 |
| 2008/0229754 A1* | 9/2008 | Goebel et al. | 60/772 |

OTHER PUBLICATIONS

European Patent Office, European Examination Report for Application No. 08 100 708.0-1225 dated Oct. 25, 2012.
European Patent Office, European Search Report for Application No. 08100708.0-1225/ 2028609 dated Oct. 11, 2012.
Yu Hudong et al.:"A Multi-level Diagnosis Methodology for Complex Systems", dated Mar. 2, 1992.
Luca Console et al:"Temporal Decision Trees: Model-based Diagnosis of Dynamic Systems On-Board", dated Oct. 1, 2003.
Flores-Loredo et al: "On Line Diagnosis of Gas Turbine using Probabilistic and Qualitative Reasoning", dated Nov. 6, 2005.
European Patent Office, European Examination Report for Application No. 08 100 708.0 dated Mar. 22, 2013.
European Examination Report for Application No. EP 08 100 708.0 dated Oct. 11, 2013.

* cited by examiner

*Primary Examiner* — Sarai Butler
(74) *Attorney, Agent, or Firm* — Ingrassia Fisher & Lorenz, P.C.

(57) ABSTRACT

A method for optimizing a diagnostic reasoner model, for use in connection with a diagnostic system for testing a system under test of an aircraft, includes the steps of querying for a plurality of primary indicators, further querying for a plurality of supplemental indicators, and updating the diagnostic reasoner model based at least in part on the supplemental indicators. The primary indicators identify one or more potential faults in the system under test. Each supplemental indicator provides information either validating or invalidating a particular primary indicator or association of primary indicators.

20 Claims, 6 Drawing Sheets

METHODS FOR OPTIMIZING DIAGNOSTICS REASONER MODELS

STATEMENT REGARDING FEDERALLY SPONSORED RESEARCH OR DEVELOPMENT

This invention was made with Government support under contract number N68335-04-C-0024 awarded by the United States Navy. The Government has certain rights in this invention.

FIELD OF THE INVENTION

The present invention generally relates to diagnostic reasoner models, and more particularly relates to optimizing diagnostic reasoner models used for testing electronics and avionics systems.

BACKGROUND OF THE INVENTION

Diagnostic systems are commonly used to test electronics, avionics systems, mechanical systems and to diagnose potential operational issues pertaining thereto. For example, certain diagnostic systems include test programs that are designed to identify potential faults in electronic systems. Such test programs may be used to run a series of independent tests on a particular electronic system to determine if there are any faults in the electronic system and, if so, to further determine the nature of such faults.

To further facilitate fault determination, certain diagnostic systems include a diagnostic reasoner based one or more artificial intelligence techniques. A diagnostic reasoner is generally designed to interactively function with other test software and/or a human maintainer. Diagnostic reasoners can provide improved testing and monitoring of electronics, avionics systems and mechanical systems.

Many diagnostic reasoner approaches are architected such that the reasoner system consists of executable reasoner software plus one or more diagnostic reasoner models (data) to hold parameters, correlations, relationships, rules and other data. The motivation for the split between reasoner software and model data may be to facilitate updates, and/or to allow a single reasoner software executable operate on a variety of systems under test through the use of distinct models for each system.

The accuracy and performance of the diagnostic reasoner is dependent on the fidelity of the diagnostic reasoner models it uses. Accordingly, there is a need for a method of learning, optimizing performance, and/or updating of a diagnostic reasoner model. The present invention addresses one or more of these needs.

SUMMARY OF THE INVENTION

Methods are provided for optimizing a diagnostic reasoner model for use in connection with a diagnostic system for testing a system under test of an aircraft. In one embodiment, and by way of example only, the method comprises the steps of querying for a plurality of primary indicators, further querying for a plurality of supplemental indicators, and updating the diagnostic reasoner model based at least in part on the supplemental indicators. The plurality of primary indicators identify one or more potential faults in the system under test. Each supplemental indicator provides information either validating or invalidating a particular primary indicator or association of primary indicators.

In another embodiment, and by way of example only, the system under test has a plurality of parts, each part having a plurality of sub-parts, and the method comprises the steps of querying for a plurality of primary indicators, further querying for a plurality of supplemental indicators, and updating the diagnostic reasoner model based at least in part on the supplemental indicators. Each primary indicator identifies, based at least in part on one or more operational symptoms, one or more potential faults in one or more parts of the system under test. Each supplemental indicator provides information either validating or invalidating a particular primary indicator or association of primary indicators.

In yet another embodiment, and by way of example only, the system under test also has a plurality of parts, each part having a plurality of sub-parts, and the method comprises the steps of running a plurality of tests, generating a plurality of primary indicators based at least in part on the tests, running one or more additional tests on a plurality of sub-parts for each part identified by the primary indicators as having a potential fault, so as to at least facilitate correlating one or more operational symptoms with one or more underlying causes, and updating the diagnostic reasoner model based at least in part on the supplemental indicators. Each primary indicator identifies, based at least in part on one or more operational symptoms, one or more potential faults in one or more parts. Each supplemental indicator provides information either validating or invalidating a particular primary indicator or association of primary indicators.

BRIEF DESCRIPTION OF THE DRAWINGS

The present invention will hereinafter be described in conjunction with the following drawing figures, wherein like numerals denote like elements.

DETAILED DESCRIPTION OF A PREFERRED EMBODIMENT

Before proceeding with the detailed description, it is to be appreciated that the described embodiment is not limited to use in conjunction with a particular type of turbine engine. Thus, although the present embodiment is, for convenience of explanation, depicted and described as being implemented in a multi-spool turbofan gas turbine jet engine, it will be appreciated that it can be implemented in various other types of turbines, and in various other systems and environments.

Figure 1:
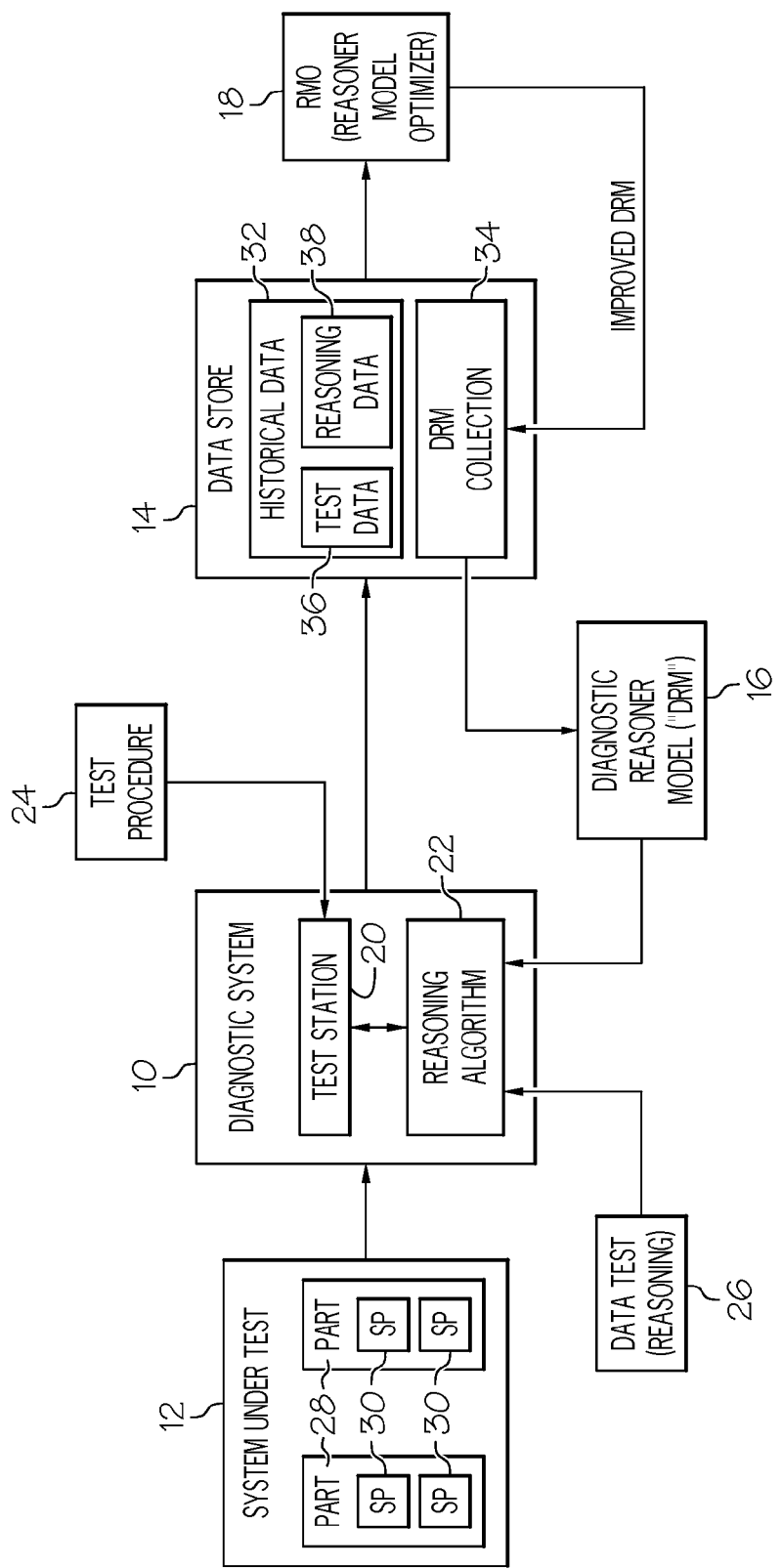
FIG. 1 is a schematic diagram of a diagnostic system for generating diagnostic information pertaining to a system under test, utilizing a data store, a diagnostic reasoner model, and a reasoner model optimizer.

FIG. 1 depicts an exemplary diagnostic system 10 for generating diagnostic information pertaining to a system under test 12, utilizing a data store 14, a diagnostic reasoner model ("DRM") 16, and a reasoner model optimizer ("RMO") 18. The diagnostic system 10 includes a test station 20 and a reasoning algorithm 22. The test station 20 is configured to implement one or more test procedures 24. The reasoning algorithm 22 is configured to implement one or more data tests 26.

The system under test 12 represents a system currently undergoing testing by the diagnostic system 10. The system under test 12 includes a plurality of parts 28, each including a plurality of sub-parts 30. In a preferred embodiment the system under test 12 is a system for an aircraft; however, this may vary in other embodiments.

The data store 14 includes historical data 32 and a DRM collection 34. The historical data 32 includes test data 36 and reasoning data 38. The test data 36 includes data from the test procedures 24 and/or other data pertaining to tests conducted by the test station 20 or otherwise by the diagnostic system 10, and/or obtained from literature in the field, prior experience and/or testing, and/or other sources. The reasoning data 38 includes data pertaining to the data tests 26, and/or other data pertaining to the reasoning algorithm 22, the DRM 16, and/or the RMO 18. The DRM collection 34 includes a collection of different DRMs 16, which can then be updated by the RMO 18, utilizing the diagnostic system 10.

The DRM 16 is in operable communication with the system under test 12 via, for example, a suitable non-depicted interface. As shown in FIG. 1, the DRM 16 is preferably selected from the DRM collection 34. The DRM 16 is used by the diagnostic system 10 in testing the system under test 12, for example in determining potential faults in, and recommending remedial action for, the system under test 12, and for various system parts 28 and system sub-parts 30 of the system under test 12. The diagnostic system 10 makes these determinations and recommendations based at least in part on an analysis of the historical data 32, and using the reasoning algorithm 22. The reasoning algorithm 22 preferably includes a roadmap for making such diagnostic determinations and recommendations, based on available operational data.

The RMO 18 is in operable communication with the data store 14 via one or more suitable, nondepicted interfaces. The RMO 18 analyzes at least portions of the historical data 32, including the test data 36 and the reasoning data 38, and performs various calculations relating thereto, preferably using one or more non-depicted algorithms or programs stored therein. Based on the calculations and analysis, the RMO 18 optimizes and updates the DRM 16 in the DRM collection 34, either directly, or indirectly through appropriate instructions provided to the data store 14.

Figure 2:
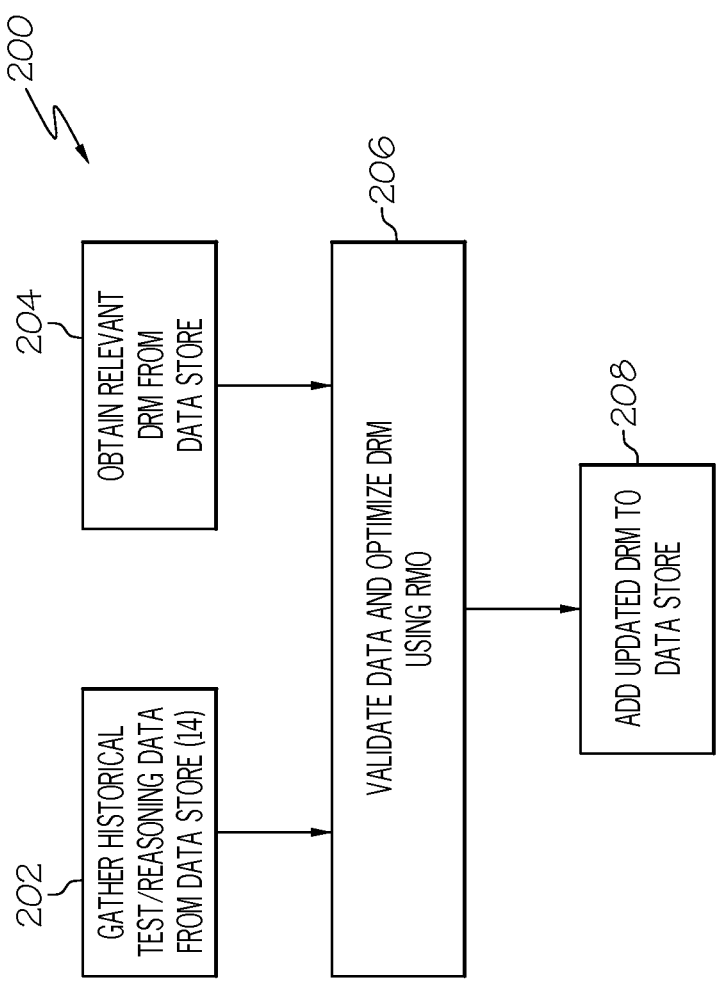
FIG. 2 is a flowchart of an optimization process that can be used to optimize and update a diagnostic reasoner model such as that depicted in FIG. 1.

Turning now to FIG. 2, an exemplary optimization process 200 is depicted for optimizing and/or updating a DRM 16. First, in step 202, test data 36 and reasoning data 38 are gathered from the historical data 32 of the data store 14. Meanwhile, in step 204, a relevant DRM 16, preferably the most recent version of the DRM 16, is obtained from the data store 14. Steps 202 and 204 can be conducted simultaneously or in either order. Next, in step 206, the test data 36 and the reasoning data 38 are validated, and the DRM 16 is optimized and updated by the diagnostic system 10, using the RMO 18. Preferably, this optimization and updating is based at least in part on an analysis of diagnostic information obtained from the test data 36 and the reasoning data 38. Next, in step 208, the optimized/updated DRM 16 is added to the DRM collection 34 of the data store 14.

Figure 3:
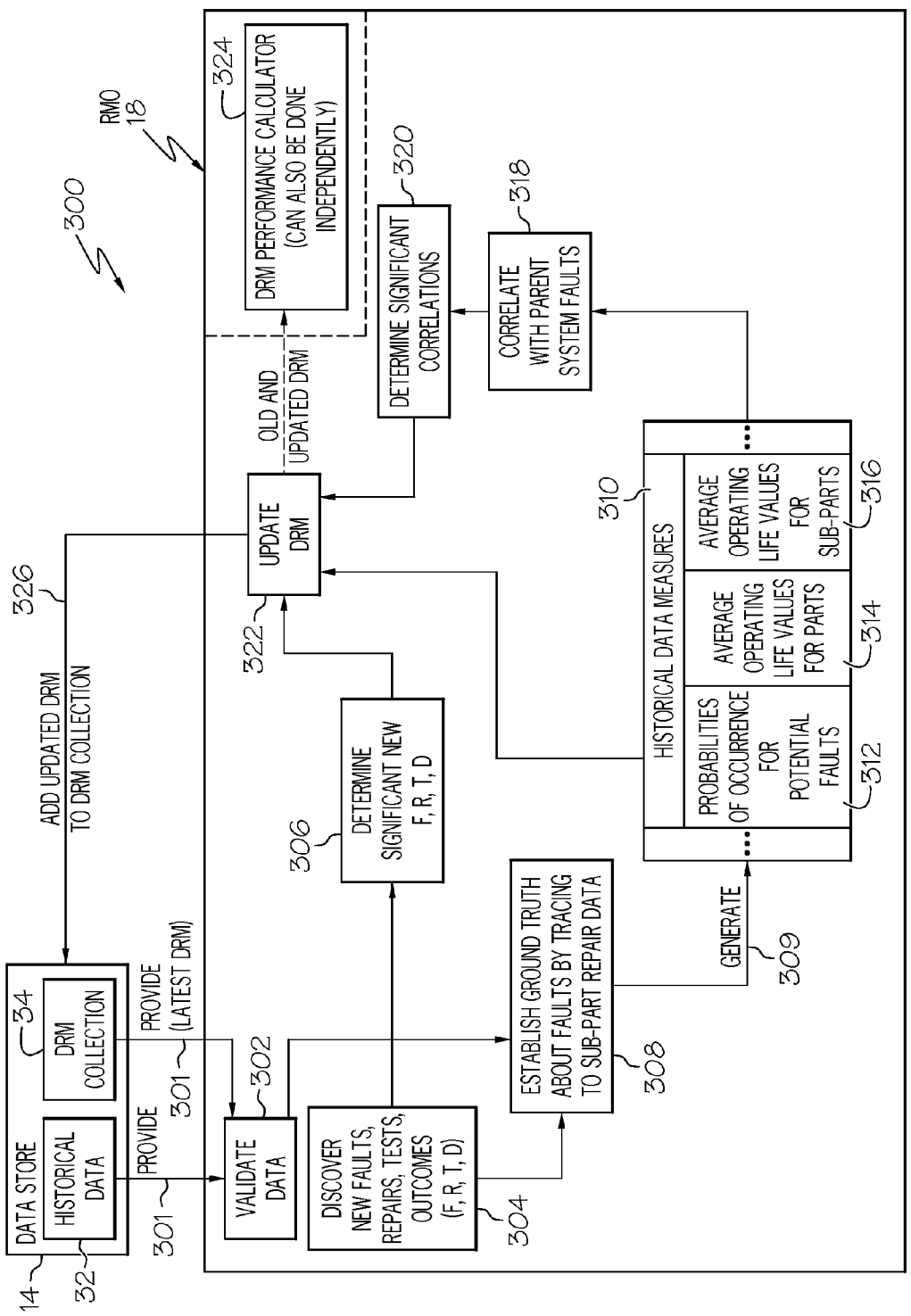
FIG. 3 is a flowchart showing, in greater detail, another optimization process that can be used to optimize and update a diagnostic reasoner model such as that depicted in FIG. 1.

Turning now to FIG. 3, another optimization process 300 for optimizing and/or updating a DRM 16 is depicted. As shown in FIG. 3, the optimization process 300 begins in step 301, in which historical data 32 is provided to the RMO 18, along with a DRM 16 from the DRM collection 34. The historical data 32 may include various types of data pertaining to the operational history of the system under test 12, similar aircraft systems, system parts 28 and system sub-parts 30 thereof, and/or various other types of data. The historical data 32 may be obtained from prior operation of the system under test 12 and/or other systems or devices, from literature in the field, and/or from any one or more of a number of different sources. Preferably in step 301 both test data 36 and reasoning data 38 are provided to the RMO 18. In addition, preferably the latest DRM 16 version from the DRM collection 34 is also provided to the RMO 18 in step 301, for updating through the optimization process 300.

Next, in step 302, the historical data 32 is validated, for example to make sure that the historical data 32 is acceptable and that it pertains to the type of testing to be conducted. For example, if a vehicle operator is not following a particular model as called for by the reasoning algorithm 22, then this can serve as an indication that the historical data 32 is invalid, meaning that further testing and analyze based on the model would not be beneficial. After the validation of the historical data 32, the process proceeds separately to steps 304 and 306, as set forth below. Regardless of the order presented below, it will be appreciated that steps 304 and 306, and various other steps of the optimization process 300, may be conducted either simultaneously or in either order.

In step 304, determinations are made regarding any new faults, repairs, tests, and/or outcomes pertaining to the system under test 12, based on the historical data 32. Next, in step 306, determinations are made as to which of the new faults, repairs, tests, and/or outcomes are significant. As will be described further below, these determinations will subsequently be used in step 322, along with various other determinations described below, to update the DRM 16.

The determinations in step 306 are preferably made at least in part based on a series of tests on the system under test 12, and/or various system parts 28 and system sub-parts 30 thereof, when there is an operational symptom suggesting a potential fault in the system under test 12. Preferably, at least some of these tests are conducted or generated at the organizational (or platform) level, and therefore pertain to the system under test 12 as a whole, or to one or more relatively large system parts 28. Preferably, in step 306, a plurality of primary indicators are generated, based at least in part on the above-mentioned testing and the reasoning algorithm 22. Each primary indicator indicates the presence or absence of a potential fault in the system under test 12, and/or in one or more particular system parts 28 and/or system sub-parts 30. Preferably, at least some of the primary indicators are conducted or generated at the above-mentioned organizational (or platform) level, and therefore pertain to the system under test 12 as a whole, or to one or more relatively large system parts 28.

Optionally, step 306 may include user feedback, such as input and analysis, from one or more persons with knowledge of the system under test 12, pertaining to one or more of the primary indicators. For example, the user feedback may include the expert opinion of an experienced operator or observer of the system under test 12, based on such person's observations and experience, as to whether a particular primary indicator appears to be correct. In addition, such user feedback may also include information regarding the costs of a particular repair option, and/or an analysis of the cost effectiveness of the repair option. Such user feedback may be important, for example, in situations in which certain operational symptoms may be better observed or analyzed hands-on by an experienced individual, and/or in which such human observations and analysis may complement those of the diagnostic system 10. As will be discussed further below, similar user feedback may also be obtained in step 308, and either or both of these types of user feedback may be used in updating and optimizing the DRM 16 in step 322.

Meanwhile, in step 308, ground truth is established regarding various faults, preferably by tracing such faults to repair data pertaining to the sub-parts 30. Preferably, step 308 includes a series of additional tests on the system under test 12, and/or various system parts 28 and/or system sub-parts 30 thereof. Preferably such additional tests are run with respect to various specific system sub-parts 30 for each system part 28 identified by one or more of the primary indicators as having a potential fault, so as to at least facilitate correlating one or more operational symptoms with one or more underlying causes of the potential faults. Preferably in step 308 a plurality of supplemental indicators are generated, representing the ground truth regarding the primary indicators, and the potential faults, repairs, tests, and outcomes represented thereby, determined in step 306. The supplemental indicators are preferably determined at least in part based on the additional tests and the reasoning algorithm 22. Preferably, each supplemental indicator provides information either validating or invalidating a particular primary indicator, which indicates whether the primary indicator correctly or incorrectly identified certain faults, or the absence thereof.

Preferably the additional tests and the supplemental indicators of step 308 are conducted or generated on one or more deeper levels than the initial tests and primary indicators from step 306. For example, the additional tests and supplemental indicators of step 308 preferably pertain to system sub-parts 30 and/or relatively smaller system parts 28. However, this need not be the case.

Optionally, step 308 may also include additional user feedback, such as input and analysis, from one or more persons with knowledge of the system under test 12, pertaining to one or more of the supplemental indicators. For example, this user feedback may include the expert opinion of an experienced operator or monitor of the system under test 12, based on such person's observations and experience, as to whether a particular supplemental indicator appears to be correct. In addition, as alluded to above, such user feedback may also include information regarding the costs of a particular repair option, and/or an analysis of the cost effectiveness of the repair option. However, such user feedback need not always be obtained in steps 306 and/or 308.

Next, in step 309, a plurality of historical data measures 310 are generated. The historical data measures 310 reflect patterns, operational norms, and/or various other types of information relevant for updating, analyzing, and/or optimizing the DRM 16. The historical data measures 310 will be utilized at least in part in updating the DRM 16 in step 322, as will be discussed further below.

The historical data measures 310 preferably include a plurality of probabilities of occurrence for potential faults ("POPF") 312, average operating life values for parts ("AOLP") 314, and average operating life values for sub-parts ("AOLS") 316. Specifically, a POPF 312 value for each potential fault in the system under test 12 represents a probability that such a potential fault may occur during operation of the system under test 12. An AOLP 314 value for each system part 28 represents a value indicative of an average operational life span of the particular system part 28. Similarly, an AOLS 316 for each system sub-part 30 represents a value indicative of an average operational life span of the particular system sub-part 30. The POPF 312 values are preferably measured in percentages, fractions, or ratios, but may also be quantified using other units of measurement. The AOLP 314 and AOLS 316 values are preferably measured in flight-hours, but may also be quantified using other units of measurement. The historical data measures 310 may also include any one or more of a number of different types of measures.

As will be discussed further below, the historical data measures 310 will also be used, in step 322, in optimizing and updating the DRM 16 in the DRM collection 34 of the data store 14.

In addition, in step 318 the historical data measures 310 are correlated with various faults pertaining to the system under test 12 that were determined in step 304. Preferably, the correlation in step 318 includes the calculation of a plurality of indicator update probability values and a plurality of part indicator success probability values. The plurality of indicator update probability values are preferably calculated based at least in part on one or more of the above-mentioned supplemental indicators, and, if obtained in steps 304 and/or 308, the user feedback. Preferably the plurality of indicator update probability values include a primary indicator success probability value for each primary indicator generated in step 304, and a part indicator success probability value for each system part 28 designated by a primary indicator as having a potential fault. Specifically, a primary indicator success probability value for each primary indicator represents a probability that the primary indicator has correctly identified a potential fault.

Similarly, a part indicator success probability value for each such system part 28 represents a probability that, if a potential fault for the particular system part 28 is identified by a primary indicator, such primary indicator has correctly identified the potential fault. Similar values may also be calculated representing probabilities that if a potential fault for a particular system sub-part 30 is identified by a primary indicator, such primary indicator has correctly identified the potential fault. In addition, various other measures may also be included in the indicator update probability values.

Next, in step 320, one or more determinations are made as to which of the correlations are significant. For example, in the above-described embodiment, a determination is made as to which of the part indicator success probability values, and/or various other measures, are significant to the testing and analysis pertaining to the unit under test 12. The determinations in steps 318 and 320 will then, as mentioned further below, be used in step 322 in optimizing and updating the DRM 16.

In one preferred embodiment of steps 318 and 320, the multi-level correlations are calculated between an outcome represented by a primary indicator generated in step 304 and a corresponding outcome represented by a supplemental indicator generated in step 308, for example as to whether the outcomes determined by the supplemental indicators verify the outcomes originally indicated in the primary indicators. This correlation can be defined as the conditional probability of occurrence of a particular fault given the test outcome in the primary indicator, and can be mathematically expressed with the following equation (Equation 1):

$$\text{Correlation} = P(F_i \text{ in Supplemental Indicator} | F_i \text{ in Primary indicator}),$$

in which "Correlation" is a determined multi-level correlation for a particular fault $F_i$, which, according to Equation 1 above, is equal to the probability that the particular fault $F_i$ is verified in a supplemental indicator of step 308, given that the same fault $F_i$ was indicated by an initial indictor in step 304.

Alternatively, such a correlation can be determined by first determining the number of times an outcome (such as a particular fault) is represented by a primary indicator has occurred as determined in step 304, and then determining the number of times that this particular outcome has been reported or confirmed in the supplemental indicators generated in step 308. This correlation can be mathematically expressed with the following equation (Equation 2):

$$\text{Correlation} = (\#F_i \text{ in Supplemental Indicators})/(\#F_i \text{ in Primary indicators}),$$

in which "Correlation" is the determined multi-level correlation for a particular fault $F_i$, which, according to Equation 2 above, is equal to the number of times that the particular fault $F_i$ is verified in a supplemental indicator of step 308, divided by the number of times that the same fault $F_i$ was indicated by an initial indictor in step 304.

Next, in step 322, the diagnostic system 10, using the RMO 18, optimizes and updates the DRM 16 using the determinations from step 306, the historical data measures 310 determined in step 309, and the significant correlations determined in step 320. Preferably, a plurality of POPF 312 values, AOLP 314 values, AOLS 316 values, primary indicator success probability values, part indicator success probability values, along with various fault determinations of steps 304 and 306, and various multi-level probability correlations determined in steps 318 and 320, are utilized in step 322 in optimizing and updating the DRM 16. However, it will be appreciated that certain of these measures may not be used, and/or may be used only for certain primary indicators, system parts 28, and/or system sub-parts 30. It will similarly be appreciated that various other measures may also be used in optimizing and updating the DRM 16. Next, in step 326, the optimized and updated DRM 16 (the "updated DRM 16") is added to the DRM collection 34 of the data store 14.

The optimization process 300 depicted in FIG. 3 and described above can help improve performance of the DRM 16. In particular, when the DRM 16 runs again in subsequent cycles, the updated DRM 16 can incorporate the historical data measures 310, the part indicator success probability values, the indicator update probability values, and/or other determined values. For example, in cases in which the diagnostic system 10 might otherwise have generated a primary indicator for a potential fault pertaining to a particular system part 28 (if using a non-updated DRM 16), the diagnostic system 10 may now, using the updated DRM 16, weigh additional evidence to help in making an even better informed decision. Such additional evidence may include, for example, one or more of the following: how close the system part 28 is to its average operating life span (using the AOLP 314 value for the system part 28); how likely the potential fault is to have occurred in ordinary operation of the system under test 12 (using the POPF 312 value for the particular potential fault); how often a particular primary indicator is typically correct (using a success probability values for the primary indicator); and how often primary indicators are typically correct with respect to a particular system part 28 at issue (using a part indicator success probability for the particular system part 28), among other possible evidence.

Thus, the DRM 16 is better able to incorporate historical data and trends, and learning regarding its own diagnostic successes and failures, in subsequent cycles. Preferably, the steps of the optimization process 300 are preferably performed by the RMO 18.

Figure 4:
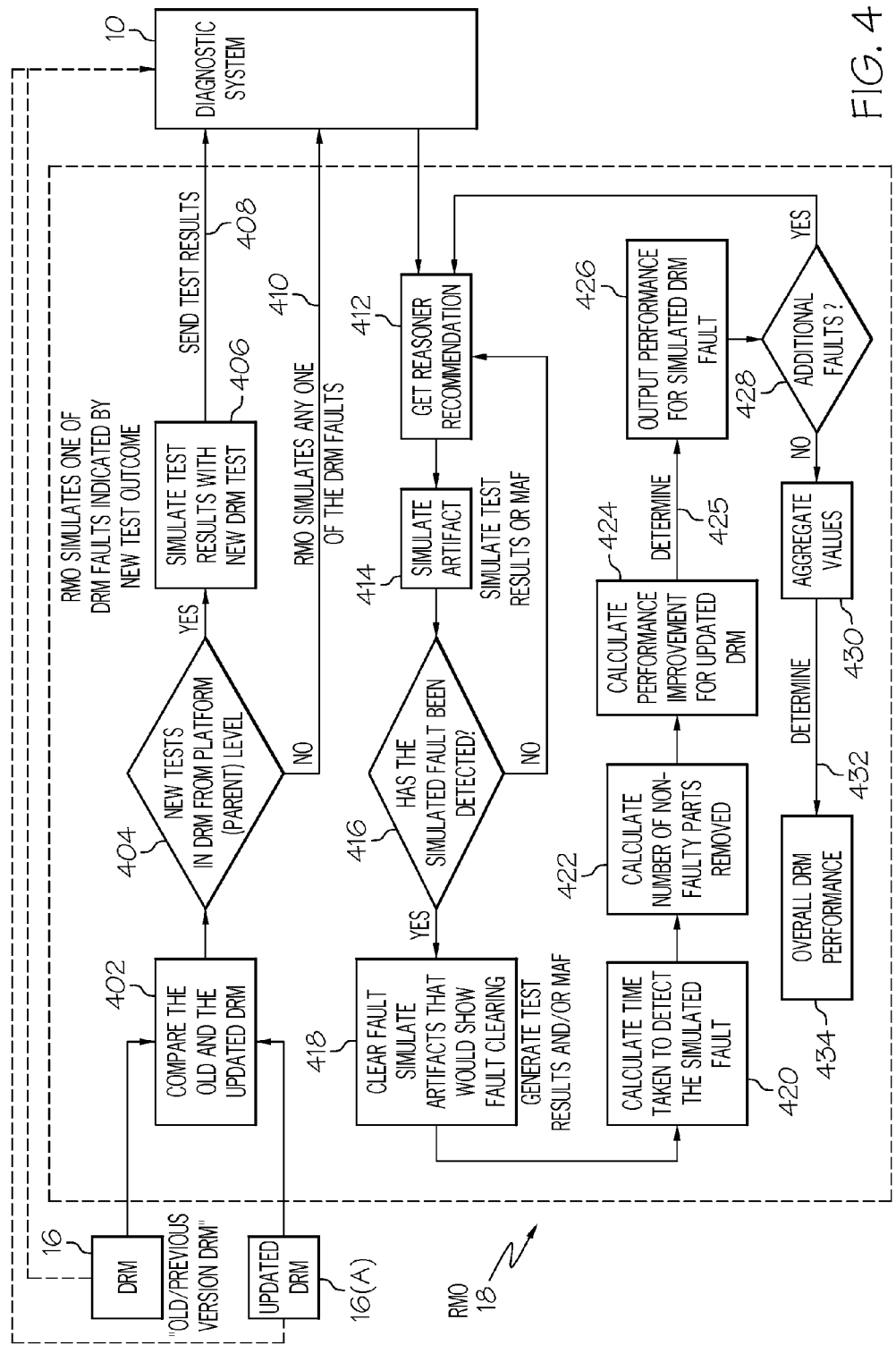
FIG. 4 is a flowchart showing an implementation process that can be used for implementing an updated diagnostic reasoner model, such as that generated in the optimization processes of FIG. 2 or 3.

Turning now to FIG. 4, an exemplary implementation process 400, for implementing an updated DRM 16, such as that generated in the optimization process 300 of FIG. 3, is shown. The implementation process 400 of FIG. 4 can be used in connection with the diagnostic system 10 of FIG. 1 using any one of a number of different multi-level hierarchical diagnostic structures. The implementation process 400 begins with step 402, in which an updated DRM 16 (for example, as generated in step 322 of the optimization process 300 of FIG. 3, and/or through another embodiment or other process) is compared with an earlier version of the DRM 16 (for example, as originally provided to the RMO 18 in step 301 of the optimization process 300 of FIG. 3).

Next, in step 404, a determination is made whether there are any new tests in the updated DRM 16 from a platform level. The platform level, as used herein, preferably pertains to an organizational, or parent, level of the system under test 12, for example pertaining to primary indicators or other diagnostic indicators pertaining to the system under test 12 and/or one of the larger parts 28 thereof. However, this may vary.

If it is determined in step 404 that there are no new platform-level tests in the updated DRM 16, then the process proceeds to step 410, in which the RMO 18 simulates any one of the possible DRM 16 faults, and information pertaining to this simulation is provided to the diagnostic system 10. Otherwise, if it is determined in step 404 that there are new platform-level tests in the updated DRM 16, then the process proceeds to step 406, in which the RMO 18 simulates test results using the new DRM 16 tests. Preferably, in step 406, the RMO 18 simulates one of the possible DRM 16 faults indicated by a new test outcome from one of the new DRM 16 tests. Next, in step 408, the simulated test results are provided to the diagnostic system 10.

Next, in step 412, the RMO 18 obtains one or more reasoner recommendations from the diagnostic system 10. Such reasoner recommendations may include, by way of example only, whether to remove one or more particular parts 28 and/or sub-parts 30, whether to run one or more additional tests thereon, and/or one or more of various other types of recommendations. Next, in step 414, one or more artifacts are simulated. The artifacts simulated in step 414 preferably simulate test results, such as those from step 406 above, and/or one or more maintenance action forms.

Next, in step 416, a determination is made as to whether a particular simulated fault has been detected using the simulated artifacts. If it is determined in step 416 that the particular simulated fault has not been detected, then the process returns to step 412. Otherwise, if it is determined in step 416 that the particular simulated fault has been detected, then the process proceeds to step 418. In step 418, the fault is treated as being cleared and, accordingly, new artifacts are simulated that would show the fault as being cleared. Preferably step 418 includes the generation of test results and/or a maintenance order form satisfying this criteria.

Next, in step 420, a calculation is made as to an amount of time taken (preferably by the diagnostic system 10, using the updated DRM 16) to detect the simulated fault. The amount of time calculated in step 420 serves as a measure of performance of the updated DRM 16, as used by the diagnostic system 10.

Next, in step 422, an additional calculation is performed as to the number of non-faulty parts 28 from the system under test 12 that were recommended for removal by the diagnostic system in step 412. Accordingly, step 422 determines another measure of performance of the updated DRM 16, as used by the diagnostic system 10, by determining how many "false-positive" recommendations were made in step 412. It will be appreciated that, in step 422 and/or other steps, various other measures of "false-positive" recommendations can also be determined, in addition to the above-referenced determinations pertaining to the removal of non-faulty parts 28 from the system under test 12, to serve as an additional measure of performance of the updated DRM 16. It will similarly be appreciated that various other performance measures may also be determined in steps 420 and/or 422, and/or in other steps.

Next, in step 424, one or more measures of performance improvement are calculated. Each measure of performance improvement includes a measure of improvement of the updated DRM 16 over an earlier version, preferably the most recent previous version, of the DRM 16. Preferably, the measures of performance improvement determined in step 424 are calculated based in part on the calculations of the amounts of time and the number of false-positive recommendations from steps 420 and 422, respectively. The measures of performance improvement are then utilized in step 425 to determine an output performance measure 426 for the above-mentioned particular simulated DRM 16 fault.

Next, in step 428, a determination is made as to whether there are any additional particular simulated DRM 16 faults to be analyzed. If it is determined in step 428 that there are additional particular simulated DRM 16 faults to be analyzed, then the process returns to step 412, and steps 412-428 preferably repeat until all of the particular simulated DRM 16 faults have been analyzed. Once it has been determined in step 428 that there are no additional particular simulated DRM 16 faults to be analyzed, then the process proceeds to step 430, in which the output performance measures from the various particular simulated DRM 16 faults are aggregated. These aggregated output performance measures are then utilized, in step 432, to determine an overall performance measure 434 of the updated DRM 16. As depicted in FIG. 4, preferably each of the steps of the implementation process 400 are performed by the RMO 18, either alone or in combination with the diagnostic system 10. However, it will be appreciated that this may vary in other embodiments.

Figure 5:
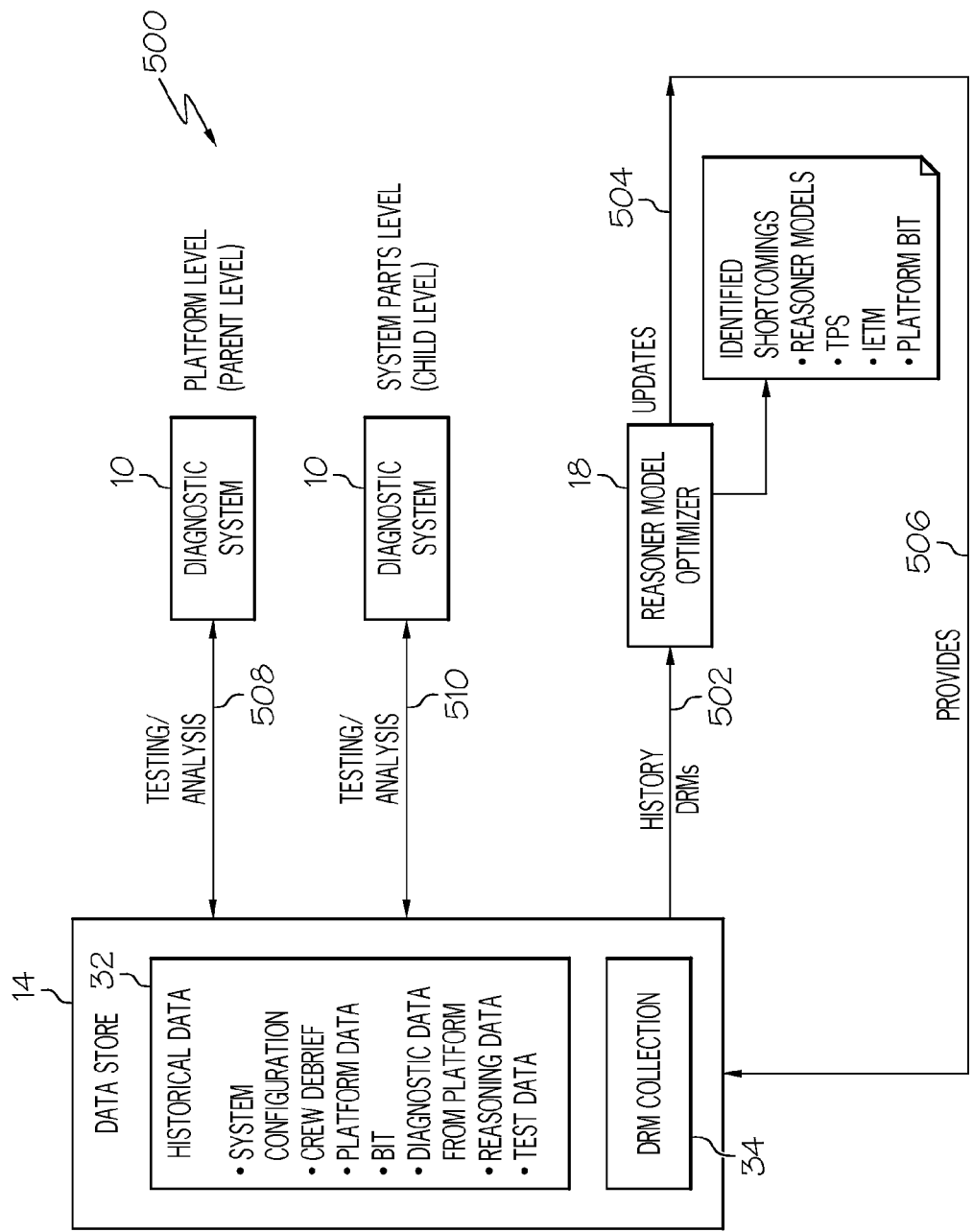
FIG. 5 is a simplified flowchart for a combined process 500 for updating a diagnostic reasoner model and implementing the updated diagnostic reasoner model.

Turning now to FIG. 5, a simplified flowchart is depicted for a combined process 500 for updating the DRM 16 and implementing the updated DRM 16 in connection with the diagnostic system 10. First, in step 502, the historical data 32 and the latest version of the DRM 16 from the DRM collection 34 are provided to the RMO 18 from the data store 14. Next, in step 504, the RMO 18 updates and optimizes the DRM 16. This optimization and updating in step 504 may be conducted, for example, using various techniques from the optimization processes 200 and/or 300 of FIGS. 2 and 3, respectively, various combinations thereof, and/or various other techniques. Next, in step 506, the RMO 18 provides the updated DRM 16 to the data store 14 for storage in the DRM collection 34 therein. Next, in steps 508 and 510, the updated DRM 16 is implemented in connection with the diagnostic system 10 using various testing and analysis from the platform level and the system parts level, respectively. This testing and analysis may be conducted, for example, using various techniques from the implementation process 400 of FIG. 4, and/or various other techniques.

Figure 6:
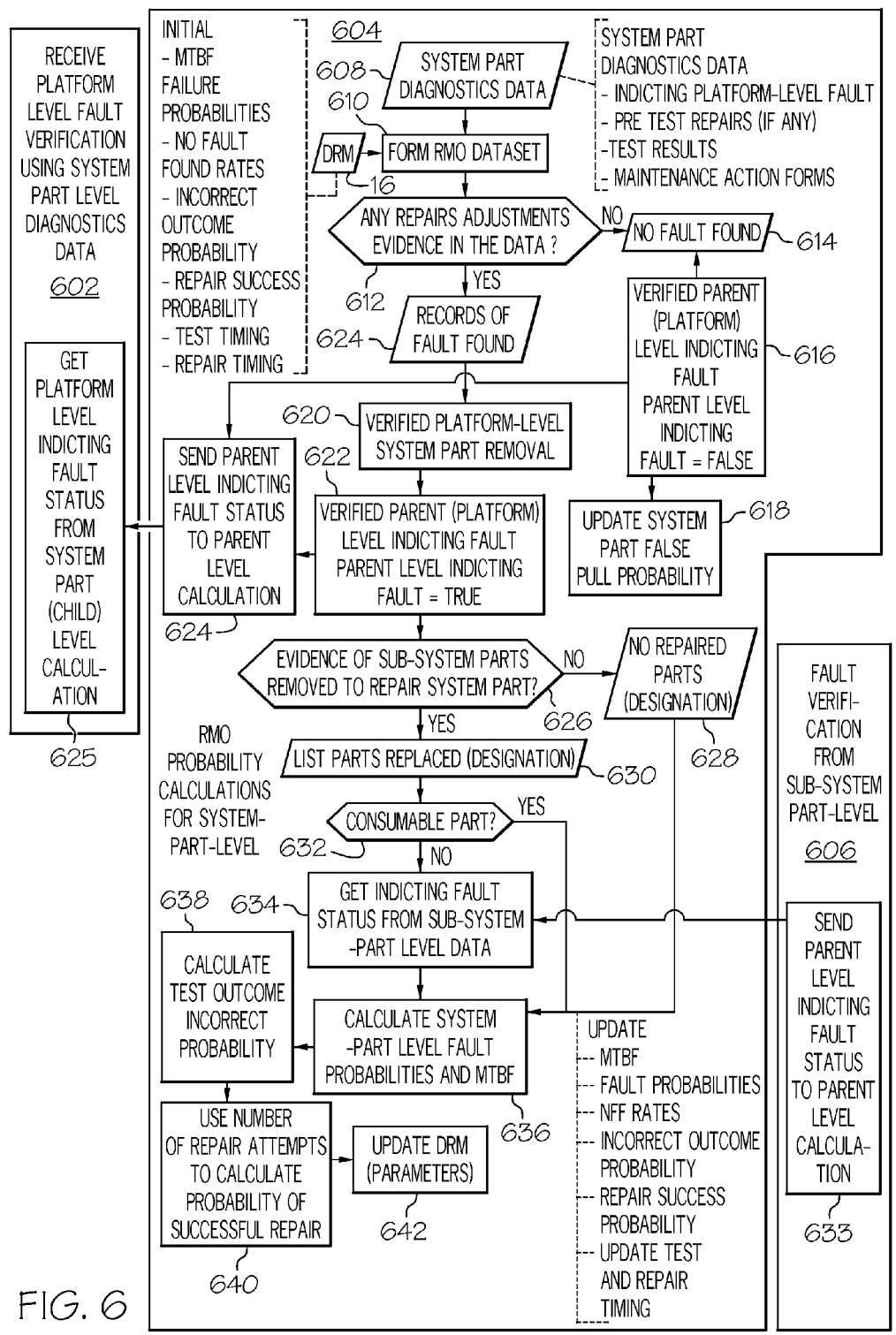
FIG. 6 is a flowchart showing another alternative optimization process that can be used to optimize and update a diagnostic reasoner model such as that depicted in FIG. 1.

Turning now to FIG. 6, 600 which is an elaboration of process 300 (FIG. 3), that can be used in connection with the diagnostic system 10 of FIG. 1 and the implementations of FIGS. 2-5. The optimization process 600 preferably includes three hierarchical levels of diagnostic analysis, namely a platform (or organizational) level 602 (preferably corresponding to the system under test 12), an intermediate level 604 (preferably corresponding to one or more system parts 28), and deeper level 606 (preferably corresponding to one or more system sub-parts 30). In addition, the implementation of the optimization process 600 of FIG. 6 may include certain variations of these levels, and/or any number of other different levels and/or sub-levels.

As shown in FIG. 6, the alternative optimization process 600 begins in step 610, in which system part diagnostics data 608 and a latest version of the DRM 16 are used to create an RMO dataset. As will be described below, the RMO dataset will be used in making various determinations at the intermediate level 604, for ultimate use in updating and optimizing the DRM 16. The system part diagnostics data 608 is preferably obtained from the historical data 32 of FIG. 1, and preferably includes various information pertaining to the operation of the system under test 12, including one or more operational symptoms or faults determined at the platform level 602, any pre-test repairs, any test results, and any maintenance action forms. The latest version of the DRM 16 is preferably used, and is preferably obtained from the DRM collection 34 of FIG. 1.

Next, in step 612, a determination is made as to whether any repairs and/or adjustments need to be made with respect to the identified system parts 28. Such a determination is preferably made based at least in part on the information in the RMO dataset, for example from the historical data 32. If it is determined in step 612 that repairs or adjustments are not necessary for a particular identified system part 28, then a no fault found indicator is generated in step 614. Such a no fault found indicator denotes that no fault was found in such system part 28, or, in other words, that a fault determination from the platform level 602 is deemed to be incorrect. The no fault found indicator is then used in step 616 to verify the fault determination from the platform level 602. This verification is then used in step 618 to update one or more probability values with respect to DRM 16 performance regarding false-positive determinations as to relevant system parts 28 at the intermediate level 604. Additionally, this verification will be used to update probability values at the platform level 602 in steps 624 and 625, as described further below.

Otherwise, if it is determined in step 612 that repairs or adjustments are necessary for a particular identified system part 28, then a fault found indicator is generated in step 620. Such a fault found indicator denotes that a fault was found in such system part 28, or, in other words, that a fault determination from the platform level 602 is deemed to be correct. The fault found indicator is then utilized in step 622 to verify the platform level 602 pull of the system part 28. Such values will then be used to update probability values at the platform level 602 in steps 624 and 625, as described below.

Next, in steps 624 and 625, the verification from steps 618 or 620 above (depending on the determination of step 612 above) are used to correspondingly update one or more probability values pertaining to DRM 16 performance at the platform level 602. Preferably, the updated probabilities pertain to the recommendation of a false pull of a system part 28 and/or sub-part 30 at the platform level 602. The updated DRM 16 will thus help to avoid making similar false pulls in the future (if a false pull was detected), and/or to provide greater degree of confidence in making future determinations of these types of faults occurring with these system parts 28 (if a false pull was not detected).

Next, in step 626, a determination is made as to whether the identified system parts 28 having one or more faults have been repaired or replaced. If it is determined in step 626 that such system parts 28 have been repaired, then a repair designation is generated in step 628, which will then be used in step 636 to update one or more system-part 28 level probabilities (preferably at the intermediate level 604), as described further below. Otherwise, if it is determined in step 626 that such system parts 28 have been replaced, then a replacement designation is generated in step 630 for use in updating the one or more system-part 28 level probabilities (preferably at the intermediate level 604) in step 636, also as described further below.

After the replacement designation is generated, a determination is made in step 632 as to whether such system parts 28 are consumable in nature. If it is determined in step 632 that such system parts 28 are consumable, then the process proceeds directly to the above-mentioned step 636, and one or more system-part 28 level probabilities are update accordingly. Specifically, in step 636, the RMO 18 updates the system-part 28 level probabilities utilizing the determinations and/or designations of steps 626-634, preferably by updating one or more intermediate level 604 fault probabilities accordingly.

Otherwise, if it is determined in step 632 that such system parts 28 are not consumable in nature, then the process proceeds to steps 633-634, in which one or more system sub-parts 30 are identified at the deeper level 606 as having and/or contributing to one or more of the potential faults, and the identified system sub-parts 30 are pulled for further testing at the deeper level 606, and the results of such testing are then incorporated into the analysis and probabilities at the intermediate level 604. The process then proceeds to step 636, and the system-part 28 level probabilities are updated (preferably at the intermediate level 604), accordingly, also using the additional information obtained in steps 630, 632, 633, and 634.

Next, in step 638, this information is used to calculate and/or update one or more probabilities that one or more particular test outcome indications are incorrect using the DRM 16 are incorrect. In addition, in step 640, various data (including a number of successful and/or unsuccessful repair attempts) are used to calculate and/or update one or more additional probabilities of a successful repair. The probabilities calculated and/or updated in steps 636-640 are then used, in step 642, to update the DRM 16, accordingly, preferably by updating various parameters thereof in light of the calculated and/or updated probabilities.

It will be appreciated that the methods described above can be used in connection with any one of numerous different types of reasoners, diagnostic reasoner models, reasoner model optimizers, diagnostic systems, aircraft systems, and/or any one of a number of other different types of system and devices. It will similarly be appreciated that certain steps of various processes described above, including without limitation steps pertaining to the generation or use of various indicators, measures, determinations, or probability values, among various other steps, may vary, and/or may be conducted simultaneously or in various orders.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the system particular embodiment disclosed as the best mode contemplated for carrying out this invention, but that the invention will include all embodiments falling within the scope of the appended claims.

What is claimed is:

1. A method for modifying a diagnostic reasoner model for use in connection with a diagnostic system for testing a plurality of systems under test, the method comprising the steps of:

querying for a plurality of primary indicators from the diagnostic system, the plurality of primary indicators identifying one or more potential faults in each system under test;

further querying for a plurality of supplemental indicators, each supplemental indicator providing information either validating or invalidating a particular primary indicator or association of primary indicators; and updating the diagnostic reasoner model, based on the primary indicators and the supplemental indicators, providing learning for the diagnostic reasoner model for subsequent use of the diagnostic reasoner model.

2. The method of claim 1, wherein the plurality of primary indicators further identify one or more symptoms and recommendations in the system under test.

3. The method of claim 2, further comprising the steps of:

calculating a probability of occurrence for each potential fault, symptom or recommendation identified by the primary indicators, based at least in part on historical data reflecting operation of the system under test; and updating the diagnostic reasoner model, based at least in part on the probabilities of occurrence, providing learning for the diagnostic reasoner model for subsequent use of the diagnostic reasoner model.

4. The method of claim 2, further comprising the steps of:

calculating a success probability based on the supplemental indicators for each primary indicator, each success probability representing a probability that a primary indicator has correctly identified a potential fault, symptom, or recommendation; and updating the diagnostic reasoner model, based at least in part on the success probabilities, providing learning for the diagnostic reasoner model for subsequent use of the diagnostic reasoner model.

5. The method of claim 1, wherein:

each system under test includes a plurality of parts, each part having a plurality of sub-parts;

each primary indicator identifies a potential fault in a particular part based at least in part on one or more operational symptoms; and each supplemental indicator is generated by correlating the primary indicators of one or more sub-parts with the primary indicators of parts.

6. The method of claim 5, further comprising the steps of:

calculating a part indicator success probability for each part based at least in part on the supplemental indicators, each part indicator success probability representing a probability that, if a potential fault for the particular part is identified by a primary indicator, such primary indicator has correctly identified the potential fault; and updating the diagnostic reasoner model, providing learning for the diagnostic reasoner model for subsequent use of the diagnostic reasoner model, based at least in part on the part indicator success probabilities.

7. The method of claim 5, further comprising the steps of:

calculating an average operating life value for each part based at least in part on historical data reflecting operation of the system under test, each average operating life value reflecting a usage parameter; and updating the diagnostic reasoner model, providing learning for the diagnostic reasoner model for subsequent use of the diagnostic reasoner model, based at least in part on the average operating life values.

8. The method of claim 5, further comprising the steps of:
calculating an average operating life value for each sub-part based at least in part on historical data reflecting operation of the system under test, each average operating life value reflecting an average period of time and/or other usage parameter for which a particular sub-part operates correctly; and
updating the diagnostic reasoner model, providing learning for the diagnostic reasoner model for subsequent use of the diagnostic reasoner model, based at least in part on the average operating life values.

9. The method of claim 1, further comprising the steps of:
obtaining supplemental feedback, from one or more of an operator of the system under test and an operator of the reasoner model optimizer, analyzing one or more of the primary indicators and supplemental indicators; and
updating the diagnostic reasoner model, providing learning for the diagnostic reasoner model for subsequent use of the diagnostic reasoner model, based at least in part on the supplemental feedback.

10. The method of claim 9, wherein the supplemental feedback includes information pertaining to a cost effectiveness of a particular repair option pertaining to one or more of the primary indicators and supplemental indicators.

11. The method of claim 1, wherein the supplemental indicators are generated also at least in part based on when the primary indicators were generated.

12. The method of claim 1, further comprising:
calculating a correlation between an outcome represented by one of the primary indicators and a corresponding outcome represented by one of the supplemental indicators;
wherein the diagnostic reasoner model is updated based on the calculated correlation.

13. The method of claim 12, wherein the correlation comprises a conditional probability of occurrence of a particular fault given a test outcome in the primary indicator, as reflected in the following equation:

Correlation=$P(F_i$ in Supplemental Indicator$|F_i$ in Primary indicator), in which "Correlation" is the correlation for a particular fault $F_i$, and is equal to the probability that the particular fault $F_i$ is verified in a supplemental indicator given that the same fault $F_i$ was indicated by a primary indicator.

14. The method of claim 12, wherein the correlation is calculated by:
first determining the number of times a particular fault has been represented by a primary indicator;
subsequently determining the number of times that this particular outcome has been reported or confirmed in the supplemental indicators generated; and
calculating the correlation based on the number of times that a particular fault has been represented by a primary indicator and the number of times that this particular outcome has been reported or confirmed in the supplemental indicators generated.

15. The method of claim 12, wherein the correlation is calculated in accordance with the following equation:

Correlation=(#Fi in Supplemental Indicators)/(#Fi in Primary indicators), in which "Correlation" is the correlation for a particular fault Fi, and is equal to (A) the number of times that the particular fault Fi is verified in supplemental indicators (i.e., "#Fi in Supplemental Indicators"), divided by (B) the number of times that the same fault Fi was indicated in the primary indicators (i.e., "#Fi in Primary indicators").

16. A method for modifying a diagnostic reasoner model for use in connection with a diagnostic system for testing a plurality of systems under test of an aircraft, each system under test having a plurality of parts, each part having a plurality of sub-parts, and the method comprising the steps of:
querying for a plurality of primary indicators from the diagnostic system, each primary indicator identifying, based at least in part on one or more operational symptoms, one or more potential faults in one or more parts of one of the plurality of systems under test;
further querying for a plurality of supplemental indicators, each supplemental indicator providing information either validating or invalidating a particular primary indicator or association of primary indicators; and
updating the diagnostic reasoner model, providing learning for the diagnostic reasoner model for subsequent use of the diagnostic reasoner model, based on the primary indicators and the supplemental indicators.

17. A method for optimizing a diagnostic reasoner model for use in connection with a diagnostic system for testing a plurality of systems under test of an aircraft, each system under test having a plurality of parts, each part having a plurality of sub-parts, and the method comprising the steps of:
running a plurality of tests;
generating a plurality of initial indicators from the diagnostic system, based at least in part on the tests, each initial indicator identifying, based at least in part on one or more operational symptoms, one or more potential faults for one or more parts;
running one or more additional tests on a plurality of sub-parts for each part identified by the initial indicators as having a potential fault, so as to at least facilitate correlating one or more operational symptoms with one or more underlying causes;
generating a plurality of supplemental indicators based at least in part on the one or more additional tests, each supplemental indicator providing information either validating or invalidating a particular initial indicator or association of primary indicators; and
updating the diagnostic reasoner model based at least in part on the initial indicators and the supplemental indicators, providing learning for the diagnostic reasoner model for subsequent use of the diagnostic reasoner model.

18. The method of claim 17, further comprising the steps of:
calculating a probability of occurrence for each potential fault identified by the initial indicators, based at least in part on historical data reflecting operation of the system under test; and
updating the diagnostic reasoner model based at least in part on the probabilities of occurrence, providing learning for the diagnostic reasoner model for subsequent use of the diagnostic reasoner model.

19. The method of claim 17, further comprising the steps of:
calculating a success probability for each primary indicator, each success probability representing a probability that a primary indicator has correctly identified a potential fault, based at least in part on the supplemental indicators; and
updating the diagnostic reasoner model based at least in part on the success probabilities for each primary indicator, providing learning for the diagnostic reasoner model for subsequent use of the diagnostic reasoner model.

20. The method of claim 17, further comprising the steps of:

calculating a part indicator success probability for each part based at least in part on the supplemental indicators, each part indicator success probability representing a probability that, if a potential fault for the particular part is identified by a primary indicator, such primary indicator has correctly identified the potential fault; and updating the diagnostic reasoner model, based at least in part on the part-indicator success probabilities, providing learning for the diagnostic reasoner model for subsequent use of the diagnostic reasoner model.

\* \* \* \* \*